Oct. 23, 1962 D. L. JAFFE ETAL 3,060,427
ELECTROMAGNETIC RADIATION MONITOR WITH
FREQUENCY AND AZIMUTH INDICATOR
Filed May 9, 1958 6 Sheets-Sheet 1

Fig. 1.

INVENTORS
D. L. JAFFE
A. H. SONNENSCHEIN
BY
Darby & Darby
ATTORNEYS

Oct. 23, 1962  D. L. JAFFE ETAL  3,060,427
ELECTROMAGNETIC RADIATION MONITOR WITH
FREQUENCY AND AZIMUTH INDICATOR
Filed May 9, 1958  6 Sheets-Sheet 2

Fig. 3.

INVENTORS
D. L. JAFFE
A. H. SONNENSCHEIN
BY Darby & Darby
ATTORNEYS

3,060,427
ELECTROMAGNETIC RADIATION MONITOR WITH FREQUENCY AND AZIMUTH INDICATOR
David Lawrence Jaffe, Great Neck, and Abraham H. Sonnenschein, Bayside, N.Y., assignors to Polarad Electronics Corporation, Long Island City, N.Y., a corporation of New York
Filed May 9, 1958, Ser. No. 734,274
17 Claims. (Cl. 343—118)

The present invention relates to apparatus for determining and displaying the frequency and azimuth of electromagnetic radiation such as radar signals, radio signals and the like. More particularly the invention relates to apparatus of the above type having an analog-type monitor display and highly accurate direct-reading digital displays for determining azimuth and frequency of signals selected from the monitor display.

It is accordingly an object of the present invention to provide frequency and azimuth indicators for radiation monitoring utilizing a direct reading digital display device.

It is another object of the present invention to provide a frequency and azimuth indicator for radiation monitoring wherein the signals of different frequency from the same azimuth may be individually identified.

It is still another object of the present invention to provide a frequency and azimuth indicator for radiation monitoring wherein signals of the same frequency from different azimuths may be individually identified.

It is still another object of the present invention to provide a frequency indicator for a broad frequency band electromagnetic radiation monitor wherein the broad band frequency scanning apparatus includes a first step-type frequency scanner covering a broad frequency band and utilized as a first local oscillator and a second relatively narrow frequency-range frequency-modulated local oscillator.

It is still another object of the present invention to provide a monitor display for an electromagnetic radiation monitor wherein the display is in the nature of a J-scope display with the azimuth displayed on the angular coordinate and the frequency displayed on the radial coordinate.

It is a further object of the present invention to provide a J-scope type display for a radiation monitor with a frequency cursor and an azimuth cursor arranged so that one of the signals displayed on the J-scope may be selected and its frequency and azimuth may be determined with a high degree of accuracy on direct reading digital type indicators.

It is a still further object of the present invention to provide an azimuth indicator for a radiation monitor including a time of maximum amplitude determination circuit for determining the center of the receiving pattern of a rotating antenna and thus allowing the azimuth determination to be made with a much smaller angular error than the angular beam width of the antenna.

A general description of the apparatus will be helpful in understanding the more detailed description which follows. A particularly useful radiation monitoring device is provided by including both a composite frequency and azimuth display covering a broad range of frequencies and 360° of azimuth which is supplemented by highly accurate frequency and azimuth indicators arranged so that any one of many possible signals on the overall display may be selected to determine its frequency and azimuth with a high degree of accuracy.

Both the accuracy and the ease of reading of the frequency and azimuth displays are enhanced by utilizing a digital type indicator.

The apparatus utilized to carry out this operation includes a radio receiver which scans a wide range of frequencies at a predetermined time rate. Simultaneously but at a slower rate a directional receiving system such as a rotating directional antenna scans through 360° of azimuth. The system is arranged so that during the period that the directional receiving system beam pattern passes a given point there must occur at least one complete frequency scan. In this way the time of indication of a received signal is dependent both upon its azimuth and upon its frequency.

A cathode ray tube display is arranged so that the azimuth of each received signal is indicated by its angular position circumferentially about the center of the cathode ray tube while its frequency is indicated by its position radially from the center of the cathode ray tube. The cathode ray tube display accordingly presents in readily comprehensible form a moderately accurate representation of the frequency and azimuth of all received signals within a wide range.

Two cursors, preferably of electronic type, are incorporated in the cathode ray tube display. One of these cursors is a rotatable radial cursor while the other is an expandible circular cursor. Thus the circular cursor identifies all signals of a given frequency while the radial cursor identifies all signals having a given azimuth. A particular signal having a given azimuth and given frequency may be selected by orienting the two cursors to intersect at the point which is occupied by the pip identifying the signal.

Electronic gates are provided which operate in conjunction with the cursors to select signals having corresponding frequency and azimuth. The precise time of occurrence of a selected signal accurately indicates its frequency. A counting circuit is utilized to count time intervals from the beginning of a frequency scan until the reception of a signal at the frequency scanned output to cause a digital indication of the frequency of the signal with an accuracy much greater than it is possible to obtain from the cathode ray tube display.

A high accurate azimuth indication is also derived in a similar manner. A signal scanned in azimuth but preferably not scanned in frequency is supplied to a time-of-maximum-amplitude determination circuit to ascertain the exact time at which the received signal is at a maximum and thus the time at which the center of the antenna beam pattern crosses the point of origin of the signal. An azimuth pulse counting circuit is provided to accurately indicate the angular separation of the azimuth of the received signal from a reference azimuth.

From the foregoing general description it will be seen that apparatus is provided for producing a composite indication of the approximate frequency and azimuth of all received signals within a wide range of frequencies and at the same time to provide a highly accurate indication of the frequency and azimuth of a signal selected from the composite display.

It should be understood that the general description above refers to the specific embodiment illustrated and is not intended to define the scope of the invention which is to be defined by reference to the appended claims.

Other features of the invention will be apparent from a consideration of the following description in conjunction with the appended drawings, in which.

Figure 1:
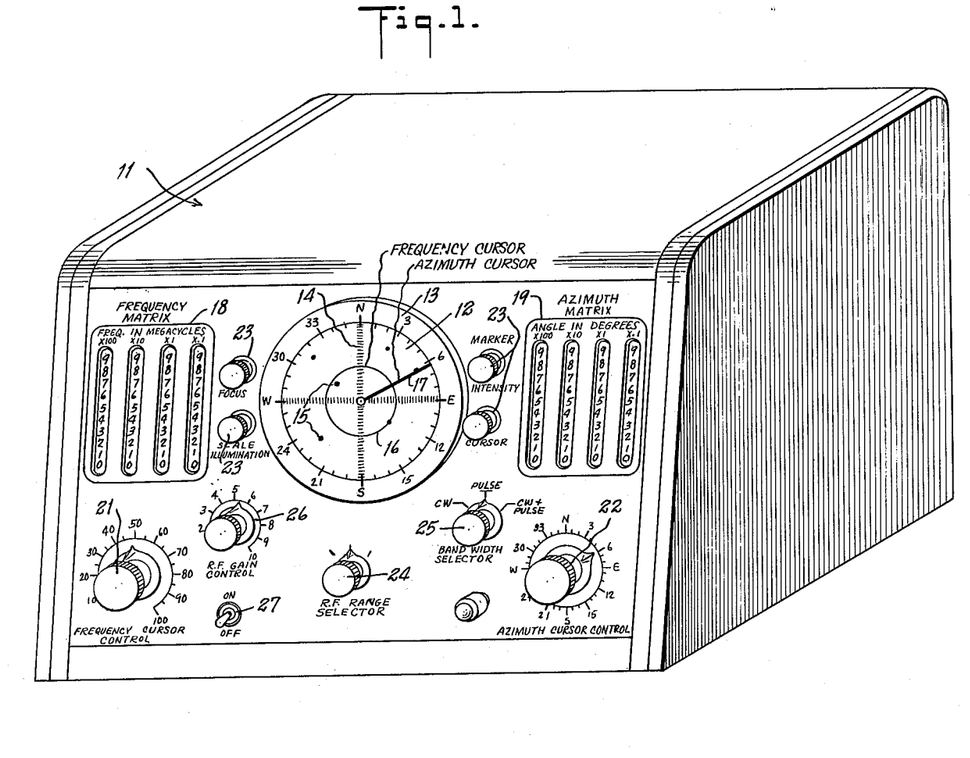
FIG. 1 is an isometric view of a housing and indicator and control console for apparatus according to the present invention.

Referring now to FIG. 1, a control and indicator unit 11 is shown for a radiation monitor. The control unit contains a microwave receiver components and the frequency and azimuth determining and indicating elements of the device. A high frequency radio direction-finding antenna would be used in conjunction with the control and indicator unit 11 to form a complete system. The antenna could be of any suitable type for the frequencies involved and is not shown in detail as it is a conventional element of the art.

A cathode ray tube display 12 is mounted in the control unit 11. This display is of the "J" scope type except for the substitution of frequency for range in the conventional "J" scope display. In other words, the azimuth of a radio transmitter or source being received is indicated by the angular position of a pip or spot 15 on the face of the cathode ray tube 12 while the frequency of the signal being received is indicated by the radial distance of the pip from the center of the cathode ray tube display 12.

An azimuth scale 13 is provided around the periphery of the cathode ray tube face 12 so that the azimuth of a transmitter being monitored will be read directly from the scale 13. Radial indicia 14 are provided on the face of the cathode ray tube display 12 so that the frequency of the received signal may be determined with moderate accuracy.

It is the purpose of the cathode ray tube display 12 to provide only a rough or approximate indication of the frequency and azimuth of a transmitter being monitored. The cathode ray tube display 12 also provides the advantage that all stations in all directions having frequencies within a given band can be monitored simultaneously. Any movement or appearance or disappearance of a signal is therefore instantly discernible.

The cathode ray display tube 12 may not be sufficiently accurate to determine the exact azimuth for certain purposes or for determining the exact frequency to distinguish between various stations closely spaced in frequency. If the operator of the control unit 11 desires to obtain more precise azimuth and frequency information he may then orient a frequency cursor 16 and an azimuth cursor 17 so that they intersect on the pip such as 15 indicating the signal for which more precise information is desired. The cursors 16 and 17 are preferably traces of the tube face 12 produced electronically in a manner which will later be described.

When the cursors 16 and 17 have been oriented to intersect at a particular pip on the face of the cathode ray tube 12, precise frequency and azimuth information is provided at a digital frequency display 18 and a digital azimuth display 19. The digital displays 18 and 19 may for example comprise neon-light-type digital counters well known in the electronic art. The counters for the digital displays 18 and 19 are illustratively shown as having a capacity of 9,999. The capacity is adequate to provide azimuth information from zero to 360° with an accuracy of $\frac{1}{10}$ of one degree and to provide frequency information with a range from 100 megacycles to 1000 megacycles with an accuracy of $\frac{1}{10}$ of a megacycle.

The frequency cursor is controlled by a frequency cursor control knob 21 while the azimuth cursor is controlled by an azimuth cursor control knob 22. Various control knobs 23 are provided to control the focus, intensity, etc., of the image on the cathode ray tube screen 12 in the customary manner.

A frequency range selector knob 24 is provided to select the range of frequencies to be monitored. A bandwidth control 25 and an RF gain control 26 are provided on the front of the control unit 11 and control the microwave receiver bandwidth and gain in the customary fashion.

Figure 2:
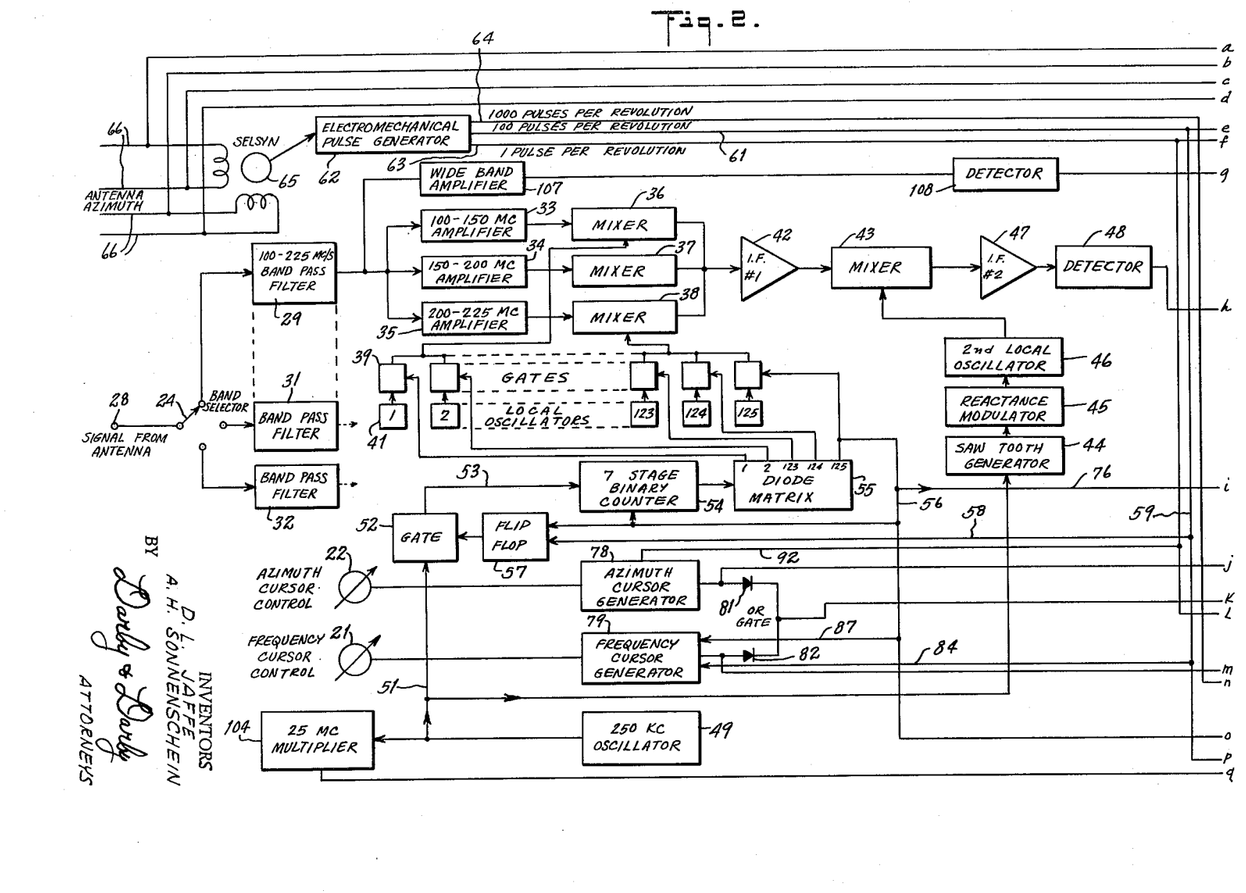
FIG. 2 is a block diagram of a first frequency and azimuth determination portion of an electrical circuit according to the present invention.
Figure 3:
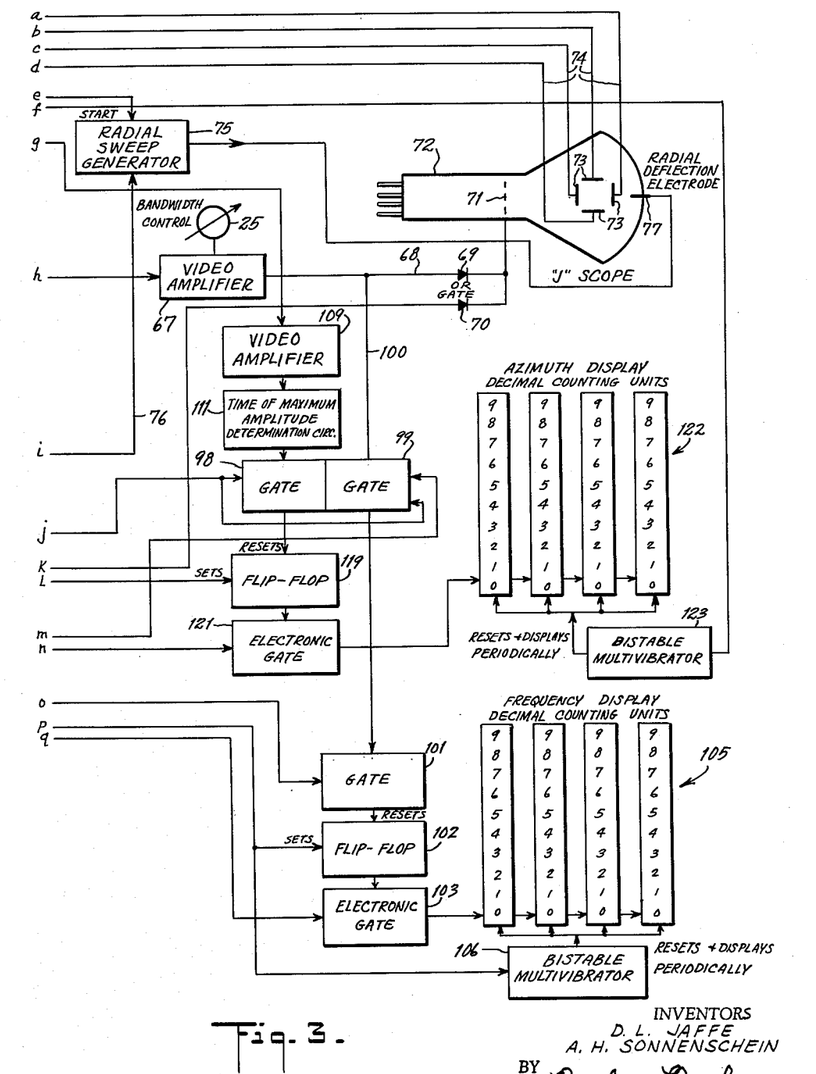
FIG. 3 is a schematic block diagram of the indicating portion of the electrical circuit of the present invention and with FIG. 2 comprises a complete electrical circuit according to the present invention.

The electrical circuit of the present invention is shown in FIGS. 2 and 3. The RF input from the direction-finding antenna is supplied to terminal 28 in FIG. 2. The details of construction of the antenna do not form a part of the present invention and are accordingly not shown.

The RF input at terminal 28 is directed by means of the RF band selector switch 24 to one of three filters 29, 31 or 32. Each of the three filters is associated with a microwave receiver and frequency analyzer for a particular range of frequencies. For simplicity only the circuit associated with the uppermost bandpass filter 29 is shown. Obviously a smaller or larger number of receivers and analyzers may be used depending upon the total frequency range to be covered.

Any one of many well known filter arrangements may be utilized for the bandpass filters 29, 31 and 32. As an example, these filters may be constructed as shown at p. 215 in "Reference Data for Radio Engineers," published by International Telephone and Telegraph Co. 4th Ed. The circuits associated with bandpass filters 31 and 32 would be substantially identical except for frequency and have therefore been omitted for clarity. It will be understood that in part the elements shown for the first band could be used for the second and third bands.

The filter 29 is a band-pass filter passing a certain frequency range, illustratively shown as 100 to 225 mc. The output from the filter 29 is fed to three amplifiers 33, 34 and 35 arranged in parallel and each adapted to amplify a limited portion of the frequency range passed by the bandpass filter 29. For example amplifier 33 is adapted to amplify signals from 100 to 150 mc.; amplifier 34 is for frequencies of 150 to 200 mc. and amplifier 35 is for frequencies of 200 to 225 mc. The amplifiers 33, 34 and 35 may be constructed for the frequencies involved in accordance with well known practice in the art. For example, amplifiers 33, 34 and 35 may be constructed as shown at page 442 of the "Radio Engineers Handbook" by Terman. When desired fewer or more amplifiers may be used to cover the desired band.

The amplifiers 33, 34 and 35 are coupled to respective mixers 36, 37 and 38. Mixers 36, 37 and 38 may be constructed as shown at page 570 of the "Radio Engineers Handbook" by Terman. Of course other suitable mixer circuits known in the art could be utilized for mixers 36, 37 and 38. The mixers 36, 37 and 38 are also supplied with signals from local oscillator signal sources 41 through electronic gates 39. In the arrangement shown there are 125 local oscillator signal sources 41. Although these signals could be supplied by 125 separate local oscillators it is preferred that a substantially lesser number of oscillators be used, perhaps one oscillator, and that frequency multipliers or dividers be employed to derive 125 different frequencies therefrom. Any one of a number of local oscillator circuits could be utilized for signal source 41, for example, crystal controlled circuits such as shown at page 496 of the "Radio Engineers Handbook" by Terman. As explained above, frequency multiplier or divider circuits could be utilized to reduce the number of independent oscillators required. A suitable frequency multiplier circuit is shown for example at page 23 of the "Radio Engineers Handbook" by Terman.

The frequencies of the local oscillator signal sources 41 are preferably equally spaced so that in the case of the apparatus illustrated, each local oscillator frequency would differ from the preceding one by 1 mc. so that the total range of 125 mc. of the low frequency band of the monitor is covered by the 125 local oscillator signal sources. For example, the local oscillator frequencies produced by the 125 signal sources could be 130 mc. to 255 mc. It will be noted that only a portion of the local oscillator signal sources are connected by means of their respective gates 39 to any given one of the mixers 36, 37, 38. For example, the first 50 local oscillator signal sources may be connected to mixer 36, the second 50 to mixer 37 and the last 25 to the third mixer 38. Only a portion of the 125 local oscillators are shown, the majority having been omitted from the drawing for the sake of clarity.

The local oscillator signal sources 41 operate continuously but the signals therefrom are fed sequentially one at a time through gates 39 to respective ones of the mixers 36, 37 and 38. Thus with an input signal of a constant frequency, output signals are produced from the inter-coupled outputs of the mixers 36, 37 and 38 which are varied stepwise through a range of 125 mc.

Any suitable fast acting electronic gating circuit may be utilized for gates 39 such as the gating circuit shown at page 435 of "Pulse and Digital Circuits," by Millman and Taub, so as to permit passage of but one oscillator frequency at a time, in rapid succession, under the control of the diode matrix circuit 55 described below.

As is well known, the mixing of the local oscillator signal with the input signal from the amplifiers 33, 34 and 35 results in an output containing both the sum and difference of the two frequencies of these signals. In the present example the difference frequency or low frequency is selected and the first IF amplifier 42 coupled to the mixer outputs is illustratively tuned to approximately 30 mc. with a bandwidth of about one mc.

Response to image frequencies, that is, input frequencies which differ from the desired input frequency by twice the IF frequency, are eliminated by the division of the signal into three frequency sub-bands in the amplifiers 33, 34 and 35. This may be illustrated by considering an input signal of 100 mc. This signal would be amplified only in amplifier 33. The tuned IF amplifier 42 would not accept this incoming frequency except during such period as it was mixed with a local oscillator signal of 130 mc. to produce a 30 mc. IF frequency. At the same time a 160 mc. input signal would produce a spurious response since this signal would also produce a difference frequency of 30 mc. when mixed with a local oscillator signal of 130 mc. However, this cannot occur in the arrangement shown in FIG. 2 because the 160 mc. input signal is amplified only in the second amplifier 34 and is mixed with the second set of 50 local oscillator signals which does not include the 130 mc. signal. The 160 mc. signal cannot pass through amplifier 33 tuned to 100 to 150 mc. and thus cannot mix with the 130 mc. signal.

From the foregoing example it will be seen that by providing separate sub-band amplifiers 33, 34 and 35 each having a frequency range of less than twice the IF frequency of the following stage, the possibility of interference by a signal of the image frequency (that is a frequency differing by twice the IF frequency) being received and interfering with the operation of the apparatus is positively eliminated.

As indicated above, the local oscillators 41 and gates 31 provide discrete local oscillator frequencies of 130 mc. to 255 mc. in 1 mc. steps. With IF amplifier 42 tuned to 30 mc., this means that the system is sequentially responsive to incoming signals of frequencies from 100 mc. to 225 mc. in like 1 mc. steps. Thus the amplifiers 33 to 35, mixers 36 to 38, local oscillator signal sources 41 and sequentially controlled gates 39 serve to sweep the tuning of the system in stepwise fashion, while causing image frequencies to be eliminated.

The IF amplifier 42 has a bandwidth not less than one mc. so that an input signal of any given frequency within the prescribed range would be allowed to pass through IF amplifier 42 when the appropriate one of the local oscillator signals is being fed to its respective mixers 36, 37 or 38. The electrical circuit of the IF amplifier 42 may be similar to that of amplifiers 33, 34 and 35 except for its frequency and bandwidth which may be selected in accordance with usual practice. A second mixer 43 is connected to receive the output from the first IF amplifier 42 and in turn supplies a narrow band second IF amplifier 47. Mixer 43 is arranged to sweep its effective tuning over a range of one mc. For this purpose a second local oscillator 46 is connected to provide a second local oscillator signal to the mixer 43, and the second local oscillator 46 is provided with a reactance modulator 45 driven by a sawtooth generator 44. The output frequency of the second local oscillator 46 is then swept in sawtooth fashion over a range of 1 mc. Reactance modulated local oscillator circuits are well known and any of such circuits may be utilized to provide the second local oscillator 46 and the reactance modulator 45. A suitable circuit for example is shown at page 655 of the "Radio Engineers Handbook" by Terman. The sawtooth generator 44 is also a conventional circuit, an example of which is shown at page 207 of "Pulse and Digital Circuits" by Millman and Taub.

Assuming an input signal of constant frequency at terminal 28, mixers 36, 37 and 38 with their associated circuits provide a constant frequency input to second mixer 43. The sawtooth variations or modulations of the second local oscillator frequency then causes a corresponding sawtooth variation in the frequency of the output of mixer 43. This varying frequency can pass second IF amplifier 47 only when it corresponds to the tuned frequency of that amplifier, which is a narrow band amplifier having a bandwidth on the order of the frequency resolution required in the system, such as of the order of 0.1 mc.

Figure 4:
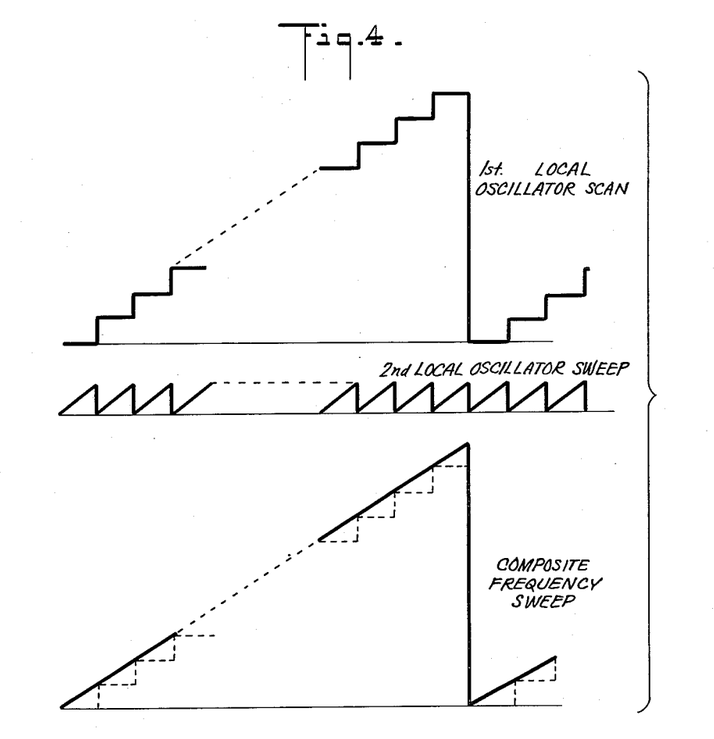
FIG. 4 is a wave-form diagram useful in explaining the operation of the composite frequency-sweep circuit utilized in FIG. 2.

The circuit of the second IF amplifier 47 may be similar to that of the first IF amplifier 42 except for the frequency and bandwidth which may be controlled by a filter or by the design of the input of the amplifier itself. The manner in which this is accomplished is illustrated in FIG. 4. The top waveform of FIG. 4 illustrates the shift in tuning produced by the first local oscillators 41. It will be noted that this is a stepwise shift which in the illustrated case would have 125 stages. Upon this is superimposed in synchronism the second local oscillator sweep which is a sawtooth frequency shift whose periodicity is the same as the duration of each step. Adding these two, the composite tuning sweep shown in the lower part of FIG. 4 is obtained. The net result is a wide-range sawtooth tuned frequency sweep having a very high degree of linearity.

The composite frequency sweep arrangement explained above is utilized in the preferred embodiment of the present invention since it is a practical and efficient way to obtain a wide-band frequency-sweep linearity of better than 0.1 megacycle.

A conventional arrangement of a single frequency-modulated oscillator driven by a sawtooth generator cannot be produced with such a high degree of linearity in the present state of the art. In any event, if an oscillator were devised to sweep such a broad range of frequencies with this degree of linearity it would require exceedingly accurate alignment and adjustment and thus be undesirable for other than laboratory use.

It will be noted that in the composite frequency sweep arrangement shown and described above, it is quite simple to obtain a frequency sweep over a range of one megacycle with a linearity considerably better than 0.1 megacycle in the second local oscillator 46. The first local oscillator signals may also be maintained to an accuracy considerably smaller than 0.1 of one megacycle. It is therefore relatively easy by combining these two frequency shifts to produce a composite tuning sweep of a very high degree of linearity extending over a wide range of frequencies.

This composite tuning sweep arrangement is particularly useful in the present invention, but may also find application in other devices performing a frequency analysis function or in complete different electronic applications.

The output of IF amplifier 47 is fed to a detector 48. The particular circuit utilized for the detector 48 does not form a part of the present invention and any suitable circuit may be used. For example, National Bureau of Standards preferred circuit No. 20 described in U.S. Government Document NABUAER 6-1-59 at page 25-3 may be utilized.

As a signal of unknown frequency is presented to the bandpass filter 29 it is fed through successive stages of the system to the detector 48 and the frequency scanning just described produces a short output pulse at the detector 48. The time of occurrence of this pulse at the detector with relation to the entire period of the frequency scan will identify the frequency of the input signal within an accuracy of $\frac{1}{10}$ of 1 mc.

The apparatus described above is in effect a microwave frequency spectrum analyzer having a high degree of accuracy and a linear relationship of frequency with time in its frequency scan and which is adapted to scan a wide range of frequencies. This apparatus is particularly useful in conjunction with the other apparatus forming a part of the radiation monitor shown and described herein. However it is obvious that the linear scan of frequency relative to time provided by the apparatus described may also be useful in other electronic apparatus of widely differing types. It is therefore not intended that the scope of the invention be limited to the application of these novel features in the particular form of apparatus described.

The frequency scan for both the first and second local oscillator signals is controlled by an oscillator 49 which illustratively may have a frequency of 250 kc. The 250 kilocycle oscillator 49 may be of any conventional design, similar to that of previously described oscillators. The signal from this oscillator 49 is fed through a lead 51 to a gate 52 and from there by a lead 53 to a counter circuit 54 having a capacity of at least 125. The counter circuit 54 is coupled to a diode matrix circuit 55. The gate 52 may be of a design similar to that of previously described electronic gating circuits. The counter circuit 54 may be a conventional 7 stage binary counter as shown at page 215 or page 467 of "Reference Data for Radio Engineers," 4th Edition, published by International Telephone & Telegraph Co. The diode matrix 55 controlled by the counter 54 is a conventional switching circuit.

In operation, when gate 52 is open, the 250 kc. oscillator 49 causes the counter 54 to be stepped successively one further position for each pulse or cycle from the oscillator. The output from the counter 54 is fed to the diode matrix 55, which is a switching matrix which causes a respective one of the gates 39 to be opened for each position of the counter 54. Thus as the counter 54 is periodically operated at the 250 kc. rate the gates 39 are sequentially opened by the diode matrix 55.

The diode matrix is a conventional switching circuit utilized for example in digital computers and other digital data processing apparatus, construction and operation of diode matrices is described for example in "Arithmetic Operations in Digital Computers," by R. K. Richards, published, 1955, by D. Van Nostrand & Co., particularly at pages 71–76. A diode switching matrix would be connected in conventional manner with each of 7 inputs connected to the respective outputs of the 7 stage binary counter. The diode matrix 55 will produce an output at a separate and distinct output terminal for each possible combination of input signals to the 7 input terminals. A 7 input diode matrix would normally have 128 output terminals of which only 125 are utilized in the apparatus described.

The binary counter and diode switching matrix described will therefore be understood to be a particular arrangement of elements adapted to serve the function of a high-speed stepping switch. Other well known techniques could equally well be used to perform this function. For example a ring-counter arrangement such as described at par. 11.9 of "Pulse and Digital Circuits," by Millman and Taub, McGraw-Hill, 1956, may be utilized. Also a binary chain such as shown in FIG. 11.1 of the same reference could be combined with logic circuitry as described in par. 11.3 for conversion from binary notation to perform the desired stepping switch function. Upon operation of the last (125th) gate 39, a signal is simultaneously supplied through a lead 56 to a "flip-flop" or bistable multi-vibrator circuit 57. The flip-flop 57 is a standard electronic circuit and may be constructed for example as shown at page 142 of "Pulse and Digital Circuits" by Millman and Taub. The lead 56 is connected to reset the flip-flop 57 and close the gate 52. The lead 56 is also connected to reset the counter 54. Alternatively, the counter 57 could be internally connected in known manner to reset itself at its 125th position. The flip-flop 57 maintains the gate 52 in closed position until a signal is received at the "set" terminal of the flip-flop 57, when the gate 52 is opened once more. This "set" terminal is connected through leads 58, 59 and 61 to a pulse generator 62 which is mechanically driven in synchronism with the continuously rotating radio locator antenna. This may be accomplished for example, by a selsyn or servo connected to drive the electro mechanical pulse generator 62 and electrically connected through wire leads 66 to a cooperating rotational sensing element on the antenna. The pulse generator 62 electro-mechanically generates a predetermined number of evenly spaced pulses for each azimuthal rotation of the antenna. Three outputs are provided at which illustratively 1000, 100 and 1 pulse per revolution respectively are produced.

The flip-flop 57 is connected through leads 58, 59 and 61 to the 100 pulse per revolution output of the electromechanical pulse generator 62. The flip-flop 57 is thus operated 100 times per antenna revolution to open the gate 52 and start the counter 54.

The counter 54 is operated at a 250 kc. rate so that each count of the counter 54 occupies 4 microseconds. A complete cycle of 125 counts of the counter 54 therefore occupies 500 microseconds or $\frac{5}{10,000}$ of 1 second, after which the counter waits for the next "set" pulse. This complete cycle of the counter 54 then takes place 100 times per antenna revolution. Any practical antenna rotation frequency would provide more than enough time for the complete cycle of operation of the counter 54 for each $\frac{1}{100}$ antenna revolution. Therefore, the rate of rotation of the antenna is not limited to any substantial extent and need not be synchronized with the operation of any other portion of the circuit. Furthermore, slight variations in antenna speed due to wind loading or other factors would not interfere with the operation of the circuit.

The output from the detector 48 contains time-coded information relative to both the azimuth and frequency of received signals. This output is fed through a video amplifier 67 and an "or" gate consisting of diodes 69 and 70 to the control grid 71 of a cathode ray tube 72. The construction of video amplifiers is well known in the art and is accordingly not specified in detail. However, a typical video amplifier circuit suitable for this apparatus is shown in U.S. Government Document NABUAER 6–1–59 at page 25–2 (NBS Preferred Circuit No. 25). A second diode 70 in the "or" gate is also connected to the grid 71 and supplies a cursor signal which is generated in a fashion later to be explained. "Or" gates 69 and 70 are simple diodes allowing passage of a signal in one direction only and thus allowing a signal to be received at the grid 71 of cathode ray tube 72 through either of the "or" gates 69 or 70. At the same time the gates 69 and 70 prevent feedback from one input channel to the other.

From the previous explanation of the circuit operation, it will be understood that 100 times per antenna revolution all signals received at the antenna are scanned to determine their frequency, and pulses will be applied to the cathode ray tube grid 71 at a time in the frequency scan indicative of their frequency.

Obviously the particular one of the 100 frequency scans per revolution in which a pulse occurs will be indicative of the azimuth from which this signal is received. The beam of the cathode ray tube 72 is deflected circularly by deflection plates 73 in coordination with the rotation of the receiving antenna. This may be accomplished by supplying the alternating signals from the leads 66 through leads 74 to deflection plates 73.

A radial sweep generator 75 is provided for generating a sawtooth waveform. The sweep generator 75 is provided with a "start" terminal and a "stop" terminal so that the sawtooth wave is started from a signal applied to the start terminal and is reset to zero upon reception of a signal at the stop terminal. The sweep generator 75 is triggered by pulses received from lead 61 connected to the 100 pulses per revolution output of electro mechanical pulse generator 62. The sweep generator 75 therefore generates a sweep which is started in synchronism with the scan of the frequency sweep circuit. The radial sweep generator operation is terminated at the end of the frequency sweep by a signal received through lead 76 from the last of the gates 39.

The output of the radial sweep generator is applied to a radial deflection electrode 77 of the cathode ray tube 72 so that the trace of the cathode ray tube 72 is swept radially from the center of the tube during each frequency scan of the frequency sweep circuits. The radial sweep generator 75 need not have an exceptionally high degree of linearity since the cathode ray tube 72 is not intended to produce a highly accurate display. The radial sweep generator 75 may be any conventional type of sweep generator. One such generator is shown for example at page 218 of "Pulse and Digital Circuits" by Millman and Taub.

It should be noted that the display of frequency and azimuth provided in the present invention wherein the azimuth is displayed angularly and the frequency is displayed radially in a cathode ray tube display apparatus has possible applications in apparatus of types quite different from that disclosed herein. It is intended that all possible applications of the composite frequency and azimuth display described herein should be included within the scope of the present invention.

The azimuth and frequency cursors on the face 12 of the cathode ray tube 72 are generated by means of an azimuth cursor generator 78 and a frequency cursor generator 79. The signals from these generators 78 and 79 are fed through respective "or" gates 81 and 82 to lead $k$ and thereby to the "or" gate 70 to the grid 71 of the cathode ray tube 72.

Figure 5:
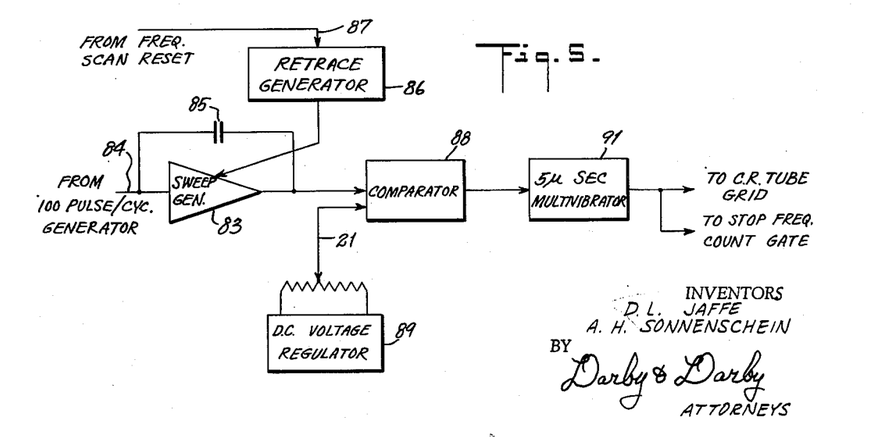
FIG. 5 is a more detailed schematic block diagram of the frequency cursor generator shown in FIG. 2.
Figures 6, 7:
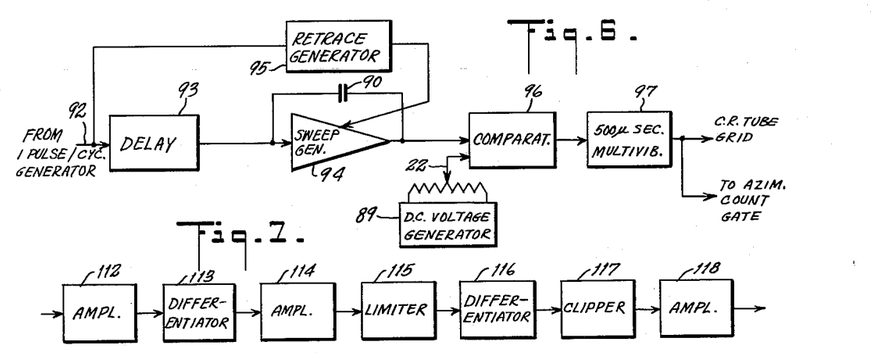
FIG. 6 is a more detailed schematic block diagram of the azimuth cursor generator shown in FIG. 2.
FIG. 7 is a more detailed schematic block diagram of the time of maximum amplitude determination circuit shown in FIG. 3.

The azimuth and frequency cursor generators are shown in greater detail in FIGS. 5 and 6 respectively. Frequency cursor generator 79 is connected to receive the frequency scan reset signal from lead 56 through a lead 87 and is also connected to receive the 100 pulse per revolution signal from the pulse generator 62 through lead 59 and another lead 84. The lead 84 is connected to the input of a sweep generator 83 which is triggered by a signal from lead 84 to start a sawtooth waveform. The sweep generator includes a shunt capacitor 85, the capacitance of which determines the rate of rise of the sawtooth waveform from the sweep generator 83. Sweep generator 83 is a conventional sawtooth generator and may be constructed in any conventional manner as was the case with sawtooth generator 44.

A retrace generator 86 is connected to the sweep generator 83 and serves to reset the sweep generator to its normal standby condition. The retrace generator 86 is actuated by the frequency scan reset signal through the lead 87. The retrace generator 86 is also a conventional circuit and may be constructed in any one of many known manners. A suitable circuit for the retrace generator 86 is shown for example at page 222 of "Pulse and Digital Circuits" by Millman and Taub. The output of the sweep generator 83 is fed to a comparator 88.

The output of the sweep generator 83 is thus a signal starting at the beginning of each frequency scan and continuing with a steadily rising potential to the end of the frequency sweep at which time it is returned to its original condition. The comparator 88 is supplied with a D.C. signal from a D.C. voltage regulator 89 which is controlled by adjustment of the frequency cursor control 21. The comparator 88 produces an output signal when the signal from the sweep generator 83 corresponds to the signal from the D.C. voltage regulator 89. The comparator is a conventional circuit and is therefore not shown in detail. The construction and operation of comparator circuits is shown and explained at page 467 of "Pulse and Digital Circuits" by Millman and Taub. The D.C. voltage regulator 89 need not be a separate voltage regulator but may be incorporated as a part of the system D.C. voltage supply. The design of D.C. voltage regulators is well known and has accordingly not been shown in detail.

The output of the comparator 88 is fed to a multi-vibrator 91. The frequency cursor multi-vibrator 81 may have a time period of the order of 5 microseconds. Upon receipt of a signal from the comparator 88 the multi-vibrator 91 produces a single output pulse of 5 microseconds duration. It will be noted that 5 microseconds is approximately 1/100 of the complete frequency scan so that the multi-vibrator 91 produces an output pulse which is fed by lead $k$ to the grid 71 of the cathode ray tube 72 to raise the cathode ray beam intensity momentarily, to produce a pip at a particular radial distance from the center of the cathode ray tube face 72 which represents the frequency of the cursor setting with an accuracy of approximately 1%. The cursor pip is produced once in each frequency scan and thus occurs 100 times in the course of rotation of the cathode ray tube trace through a complete cycle. A cursor in the form of a circle is therefore traced around the face 12 of the cathode ray tube 72 at a radial distance representative of the frequency cursor setting. The output from the multi-vibrator 91 is also utilized in the control of the digital displays in a manner which will be explained hereinafter. Multi-vibrator circuits are well known in the art and accordingly the circuit of the multi-vibrator 91 is not shown in detail. An example of a multi-vibrator circuit which may be adapted for use in the present system is shown in U.S. Government Document NABUAER 6-1-59 at page 41-2 (NBS Preferred Circuit No. 41).

The azimuth cursor generator 78 is shown in FIG. 6. It is connected by means of a lead 92 to receive the one pulse per revolution output of the pulse generator 62. The lead 92 is connected to a delay line or circuit 93 and to a retrace generator 95. The output of the delay means 93 is fed to a sweep generator 94 which is also supplied with an input from the retrace generator 95. Retrace generator 95 is similar to previously described retrace generator 86. Delay means 93 is a conventional circuit element which may take one of several known forms. As an example, it may be a delay line which may be constructed as shown at page 291 "Pulse and Digital Circuits" by Millman and Taub. The sweep generator 94 is provided with a shunt capacitor 90, the capacity of which determines the rate of rise of the sawtooth waveform generated by the sweep generator 94. Thus a pulse from the pulse generator 62 activates the retrace generator 95 to return the sweep generator 94 to normal standby condition. After a short delay to allow time for the sweep generator to return or retrace, the pulse from lead 92 is fed from the delay line 93 to start the sweep of the sweep generator 94. The sweep generator 94 therefore has an output which is a sawtooth waveform pulse, started at each output from the one pulse per revolution terminal of the pulse generator 62. It should be understood that the manner of generating the various sawtooth waveforms is illustrative only and that any of the well known methods of generating these waveforms could be utilized in the present circuit.

Figure 9:
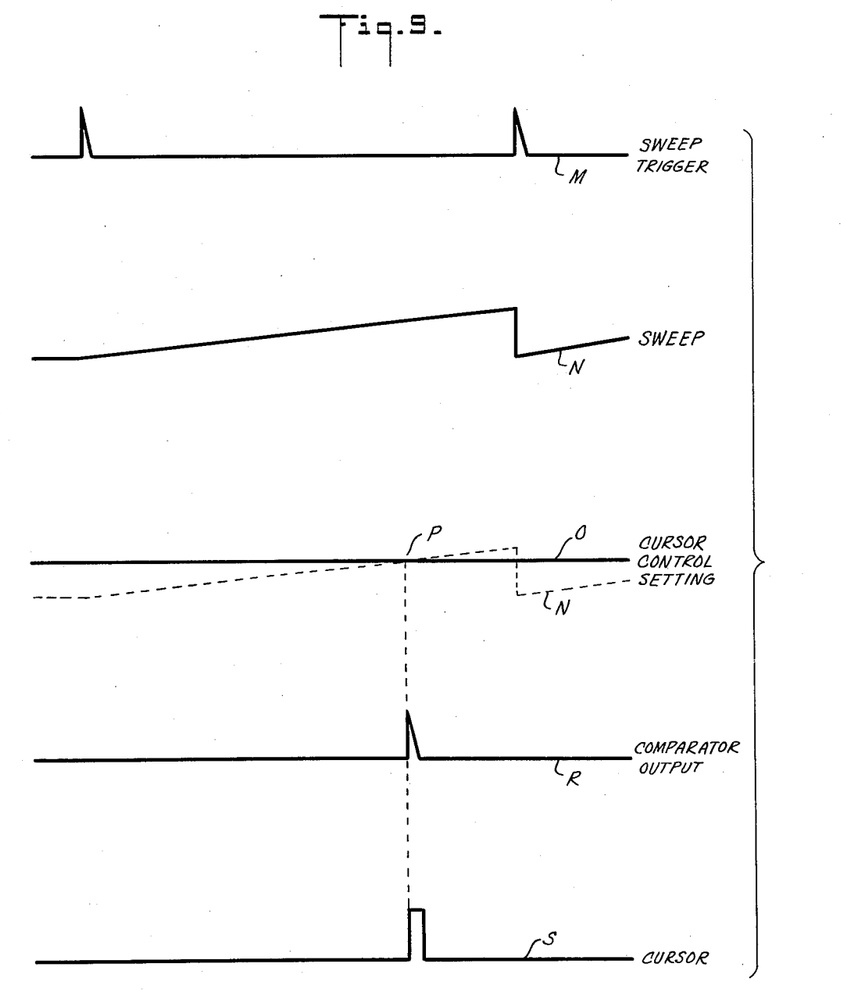
FIG. 9 is a wave-form diagram useful in explaining the operation of the frequency and azimuth cursor generator circuits shown in FIGS. 5 and 6.

FIG. 9 shows the various waveforms generated in the azimuth cursor generator and thus illustrates the operation of this circuit. At M in FIG. 9 the sweep trigger is illustrated which is in this instance the one pulse per revolution impulse from the pulse generator 62. The sawtooth waveform of the sweep generator is shown at N. At O is shown a constant voltage signal from the azimuth cursor control 22 which is fed to a comparator 96. Superimposed (as a dotted line) on the signal O is the sawtooth sweep N.

Both of these signals are fed to the comparator 96 and when the two signals correspond as at P, an impulse is produced at the output of the comparator 96. The output R of the comparator 96 is fed to a multi-vibrator 97. The multi-vibrator 97 may have an output pulse duration of 500 microseconds.

The selectivity of the azimuth cursor may be reduced by lengthening the pulse duration or may be increased by shortening the pulse duration. The selectivity of the frequency cursor may similarly be adjusted. The output of the multi-vibrator 97 is shown at S in FIG. 9.

It will thus be seen from FIG. 9 that the azimuth cursor control 22 may be adjusted so that at a given point in the rotation of the antenna through 360° of azimuth a pulse of predetermined duration will be produced. This pulse is fed by lead $k$ to the cathode ray tube grid and causes a radial trace to be produced on the face 12 of the cathode ray tube 72. The output of the multi-vibrator 97 is also utilized in the digital azimuth display in a manner which will be explained hereinafter. The operation of the frequency cursor corresponds to the operation of the azimuth cursor and will not be described in more detail.

The apparatus for generating a circular electronic cursor and the apparatus for generating a radial electronic cursor may similarly be applied singly or in combination to other systems than the radiation monitoring apparatus described herein, and it is intended that the scope of this invention shall include the use of such cursors in other systems.

As previously explained the radiation monitor according to the present invention is arranged so that orientation of the azimuth and frequency cursors to a particular pip on the face 12 of the cathode ray tube 72 causes the digital azimuth and frequency displays to operate to display precise azimuth and frequency information relative to the particular signal so identified. This is accomplished by connection of the azimuth and cursor generators 78 and 79 to gates 98 and 99 by leads $j$ and $m$. The gate 99 is opened only when signals are received from both the azimuth cursor generator 78 and the frequency cursor generator 79. Gate 98 is operated by azimuth cursor generator 78 alone. The gates 98 and 99 control the signals to the digital frequency display 122 and azimuth display 105 and thus select only the signal selected by means of the respective cursors for digital display of frequency and azimuth information.

The operation of the digital displays will now be described. The digital frequency display 105 is connected to receive the output of video amplifier 67. This output is fed by lead 100 through gate 99 which blocks all but the signals selected by means of the frequency and azimuth cursor, that is, only signals occurring simultaneously with both the cursor signals will pass. The signal from the gate 99 is fed through a further gate 101 which is controlled by the 125th output terminal of the diode matrix 55 by lead $o$. This output is energized at the end of each frequency scan so that gate 101 serves to block incoming signals from the video amplifier 67 during the retrace of the frequency scan.

The output of the gate 101 is connected to the "reset" terminal of a flip-flop 102. The "set" terminal of the flip-flop 102 is connected by lead $p$ to the 100 pulses per revolution output 61 of the pulse generator 62 and is thus energized at the beginning of each frequency scan. The output of the flip-flop 102 is connected to control an electronic gate 103, the gate 103 being opened upon reception of a signal at the "set" terminal of the flip-flop 102.

A frequency multiplier 104 is provided to multiply the 250 kilocycle output of the oscillator 49 to a 25 mc. output. This 25 mc. output is fed through the electronic gate 103 to a decimal counter 105. The flip-flop 102 is actuated by a signal at its "set" terminal upon the initiation of a frequency scan. The flip-flop thereupon opens the electronic gate 103 and the counter 105 starts to count at a 25 mc. rate. At a predetermined period of time thereafter a signal from the video amplifier 67 resets the flip-flop 102. The period of time which elapses is directly proportional to the frequency of the signal received. When the flip-flop 102 is reset it closes the electronic gate 103 thereby stopping the counter 105. The count on the counter 105 is retained and is visible to the operator until it is erased in the course of further operation of the monitor.

It will be understood that the counter 105 will be set or calibrated to count from the minimum frequency of the monitor, in this case illustratively 100 mc. It will be recalled that in the frequency scan the rate of scan is 1 mc. for every 4 microseconds. Therefore, each cycle of the 2.5 mc. multiplier 104 represents .4 microsecond which in turn represents 0.1 mc. of frequency in the frequency display. A bi-stable multi-vibrator 106 is provided to reset the counter 105 periodically upon an impulse from the pulse generator 62 over lead $p$. The multi-vibrator 106 is a standard electronic circuit one example of which is shown at page 147 of "Pulse and Digital Circuits" by Millman and Taub. It should be understood that the counter and reset mechanism shown is illustrative only and any suitable electronic counter mechanism could be utilized to provide a high frequency digital counter and display for the present invention.

It is obvious that the use of an electronic gating apparatus coupled to operate in conjunction with an electronic cursor as described above has wide possibilities for use in other systems such as radar and the like. Many obvious variations of the particular cursor-gating combination shown could be devised; for example, instead of or in addition to the gating of a time pulse signal, the received signal itself could be gated, or any other desired signal could be gated in timed synchronism with the cursor signal.

The signal to operate the azimuth display 19 is derived from the output of the bandpass filter 29 and is amplified by a wide band amplifier 107, detected by a detector 103, and further amplified by a video amplifier 109. It will be recognized that this constitutes a conventional microwave radio receiver circuit. Any conventional radio receiver circuit appropriate for the frequencies involved may be employed to perform this function. The wide band amplifier 107 may be made tunable in coordination with frequency-cursor control 21 as shown in FIG. 2.

The output of the video amplifier 109 is fed to a time-of-maximum-amplitude determination circuit 111. It is the function of this circuit to detect the time at which the center of the antenna beam pattern is projected directly toward the distant signal source as the antenna rotates, to provide a highly accurate azimuth determination of a distant signal source.

Generally the width of the beam pattern of a suitable rotatable antenna is on the order of 5°, so that it is necessary to identify a particular portion of the beam pattern in order to obtain an azimuth indication with an error significantly less than the antenna beam width, as is desired in the present case. In the present case the azimuth determination provided is of an accuracy of 1/1000 of a circle or .36°.

Figure 8:
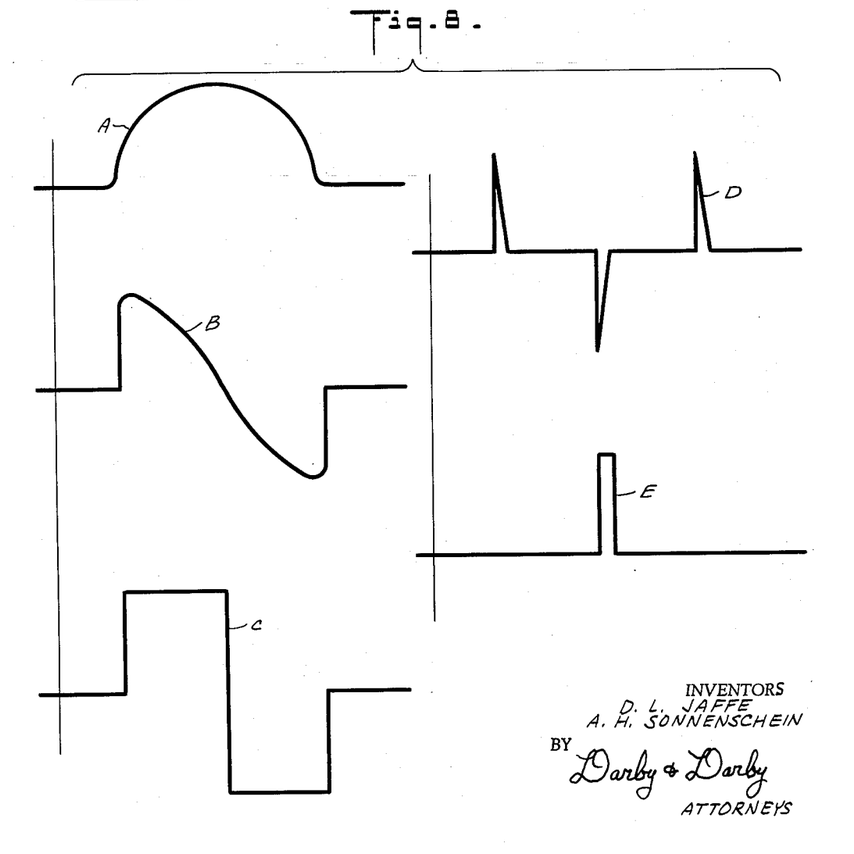
FIG. 8 is a wave-form diagram useful in explaining the operation of the time of maximum amplitude determination circuit shown in FIG. 7.

The operation of the time-of-maximum-amplitude determination circuit 111 may be understood by reference to FIG. 7 showing a block diagram of the time-of-maximum-amplitude determination circuit 111, and FIG. 8 showing the operations performed upon the incoming waveform by this circuit. The waveform A in FIG. 8 represents generally the input waveform derived from the video amplifier 109. The waveform A is generated by the sweep of the antenna receptivity pattern across the distant signal source, and has a fairly broad maximum characteristic of such patterns. The waveform A is amplified in the time-of-maximum-amplitude determination circuit 111 by an amplifier 112. The signal from the amplifier 112 is supplied to a differentiator circuit 113 which produces the waveform B shown in FIG. 8. It will be noted that the waveform B has a value which is substantially equal to the time derivative of the waveform A at each point along its length. The design and use of differentiator circuits is well known as shown for example at page 72 of "Introduction to Electronic Analogue Computers," by Wass, McGraw-Hill, 1956, and page 170 of "Radar Electronics Fundamentals," Navships 900, 016, Navy Dept. The detailed construction of differentiator circuits such as 113 is therefore omitted for simplicity.

The waveform B is amplified in amplifier 114 connected to the output of differentiator 113. Amplified waveform B from amplifier 114 is limited in a limiter circuit 115 to produce waveform C. The design of limiter circuits is well known in the art and thus the details of the limiter circuit 115 will not be shown. Typical limiter circuits are shown and described for example at page 111 of "Pulse and Digital Circuits" by Millman and Taub.

A second differentiator circuit 116 is connected to the output of limiter 115 and produces an output waveform D. The slopes of the various portions of the waveform B have been greatly sharpened by the amplifying and limiting process indicated in waveform C and this therefore causes the second differentiator waveform D to take the form of three sharp pulses or spikes, a positive pulse, a negative pulse and a positive pulse. These pulses approximate the time derivative of the various portions of the waveform C.

It will be noted that the center of the original waveform A was represented in the waveform B as the point where the waveform B crossed the zero axis, namely the point of zero slope. In C this center point was more sharply defined by the amplification and limiting process and in waveform D the center of the waveform C is identified by a large negative pulse spike. The differentiator 116 is connected to a clipper or limiter 117 removing the positive pulses in waveform D marking the beginning and end of the waveform A and retaining only the center negative pulse marking the center of the original waveform A. This pulse marking the center of the antenna beam pattern is amplified (and inverted) in an amplifier 118 and supplied in the form shown at E in FIG. 8 to the succeeding stage, namely gate 98.

Gate 98 serves to pass signals only at the particular azimuth to which the cursor generator 78 is set, as previously explained. The signal from the gate 98 is supplied to a flip-flop 119. The flip-flop 119 is set by a signal from the one-pulse-per-revolution lead 63 from the pulse generator 62. Flip-flop 119 is therefore set whenever the antenna scans past a selected azimuth, which may be identified as zero azimuth. When the flip-flop 119 is set it opens the electronic gate 121 allowing a 1000-pulses-per-revolution signal from lead 64 of the pulse generator 62 to be transmitted to a counter 122. The counter 122 is advanced one count or step for each thousandth part of an antenna revolution, until a signal is received and detected at detector 108. When this detected signal reaches its maximum, the time-of-maximum-amplitude determination circuit emits a pulse through gate 98 resetting flip-flop 119 and closing electronic gate 121. The counter 122 thereafter remains at its attained setting and displays the count representing the azimuth of the distant signal source in thousandths parts of a circle, referred to zero azimuth as a datum.

The azimuth display may of course be arranged to read directly in degrees or mils simply by causing electromechanical pulse generator 62 to provide the appropriate number of output pulses per antenna revolution.

A bi-stable multi-vibrator 123 is provided to periodically reset the counter 122 in response to the one-pulse-per-revolution output of generator 62. As in the case of counter 105, the counter 122 may be any of a number of conventional types of high frequency digital counter and display devices.

The digital frequency and azimuth circuits described above are obviously suitable for use in other systems. The digital azimuth circuit or in some cases the digital frequency circuit could be utilized as a part of radar system for example. It is intended that various other uses of the digital frequency and azimuth circuit described herein shall be included within the scope of the present invention.

The operation of the complete apparatus may be briefly recapitulated as follows: The operator selects a particular band of frequencies which he wishes to monitor by setting the band selector switch 24 to this band. The band of frequencies may be of substantial width, for example 100 to 225 mc. A frequency analyzer circuit is provided which sweeps the tuning of the receiver across the given band at a high rate, and this process is repeated many times throughout the course of one antenna revolution, illustratively, 100 times in the present example. Output pulse signals are thereby produced at the video amplifier 67 corresponding to any radiated signals being received. The portion of an antenna revolution during which the pulse occurs identifies the azimuth of the source of the pulse, and the portion of a frequency scan during which the pulse occurs identifies the frequency of the pulse.

A cathode ray tube 72 has its beam scanned circumferentially in synchronism with the rotating antenna and periodically scanned radially in synchronism with the frequency scan of the frequency analyzer circuit and produces an indication at the frequency and azimuth of the signals received. The cathode ray tube 72 therefore produces a display which conveys with limited accuracy the frequency and azimuth of all signals within the band being monitored.

The cathode ray tube display is excellent for the purpost of simultaneously monitoring a number of radio signals of differing frequencies and azimuths. However, it is not adapted to produce highly accurate frequency or azimuth information relative to the received signals. Accordingly digital azimuth and frequency displays are provided for accurate determination of these quantities. The digital displays have the advantage of being extendable to any desired accuracy and also provide an easily readable indication, not conducive to operator error.

Frequency and azimuth cursors are provided which produce respective intersecting traces on the cathode ray tube indicator. By centering these traces on the spot indicating a received signal, the frequency and azimuth displays are caused to indicate only that selected signal.

The frequency display system produces pulses at a constant rate beginning with the start of each frequency scan and ending upon the receipt of a signal from the video amplifier 67. By counting these pulses, the frequency display is caused to count from the lowest end of the band up to the frequency of the received signal and to store and display this frequency.

The azimuth display is provided with a signal from the radio receiver circuit which contains the waveform resulting from the antenna rotation. This signal is fed through special circuits to provide a pulse occurring at the maximum of the incoming signal and thereby marking the center of the antenna beam pattern. The azimuth display is continuously stepped starting at a reference azimuth at the rate of 1000 pulses per antenna revolution and continuing until the receipt of a pulse marking the center of the antenna beam pattern. The signal is thereupon shut off from the azimuth display counter causing a count to be retained in the azimuth display which is representative of the azimuth of the distant signal source.

In the preferred form of the invention described above, the azimuth and frequency displays operate only when a signal is actually received on the antenna at the frequency and at the azimuth to which the cursors are set. While this is highly desirable, aspects of the present invention may also be used as a direct reading frequency and azimuth indicator, merely by omitting gates 98 and 99 and allowing the signals from time-of-maximum-amplitude circuit 11 and from lead 100 to pass directly to the following stages of the display system. Such a direct reading indicator would of course be most useful where but a single received signal occurs.

Also, the frequency and azimuth display arrangements may be used separately, where desired.

Although a particular embodiment of the above invention has been shown and described it will be appreciated that many different circuits and devices may be employed to accept similar results by those skilled in the art without exceeding the scope of the present invention. Furthermore certain portions of the apparatus may be useful in different apparatus than that shown and described. The scope of the present invention is therefore not to be construed to be limited to the particular embodiment shown but shall include all modifications and variations thereof limited solely by the appended claims.

What is claimed is:

1. Radio frequency radiation monitoring apparatus comprising means for scanning radio frequency signals in azimuth, means for amplifying the azimuth scanned signals from the foregoing means, said amplifying means comprising at least two parallel-connected amplifiers having different ranges of frequency response, a respective mixer connected to receive the output of each of said amplifiers, means for generating a plurality of local oscillator signals of different frequencies, gating means connected to the outputs of each one of said local oscillator signals for controllably supplying said signals to one of said mixers, a frequency scan timing oscillator, a frequency scan counter, a gating means for controllably supplying the output of said frequency scan timing oscillator to said frequency scan counter, means responsive to said azimuth scanning means for opening the last said gating means, switching means for selectively operating one at a time said local oscillator signal gating means in response to said frequency scan counter and means responsive to said switching means for closing said frequency scan timing oscillator gating means upon completion of one cycle of operation of said local oscillator signal gating means, a first intermediate frequency amplifier for amplifying the output of said mixers, a second mixer connected to receive the output of said first intermediate amplifier, and a second local oscillator having its output connected to said second mixer, frequency modulating means for varying the frequency of said second local oscillator, a saw-tooth waveform generator having its output connected to control said frequency modulating means, said saw-tooth waveform generator being connected to operate in response to the signal from said frequency scan timing oscillator, a second intermediate frequency amplifier connected to receive the output of said second mixer, said second intermediate frequency amplifier being a narrow band pass amplifier, detector means connected to receive the output of said second intermediate frequency amplifier, a cathode ray tube display apparatus having radial deflection means and angular deflection means, means for operating said angular deflection means in synchronism with said azimuth scan means, means for operating said radial deflection means in synchronism with said frequency scan switching means, means for amplifying the signal from said detector means and applying said amplified signal to modulate the beam of said cathode ray tube, frequency cursor generator means for supplying a pulse to the control grid of said cathode ray tube display apparatus at a selected time after the commencement of each of said frequency scan periods, azimuth cursor generator means for supplying a pulse to said control grid at a selected portion of each said azimuth scan, said latter two means causing frequency and azimuth cursors respectively to be traced on the face of said cathode ray tube, means for generating azimuth pulses in response to angular rotation of said azimuth scanning means, means for generating a datum azimuth pulse when said azimuth scanning means scans a predetermined reference azimuth, means for counting said azimuth pulses for a selected time period, means for starting said azimuth pulse counting means in response to said datum azimuth pulse, means for discontinuing the count of said azimuth pulses in response to the reception of a maximum in amplitude of an azimuth scanned signal, means for generating a plurality of frequency scan pulses during each frequency scan, said pulses being caused to occur at predetermined frequency values, means for counting said frequency scan pulses, means for starting said frequency scan pulse counting means in response to the commencement of said scan, means for discontinuing the count of said frequency scan pulses in response to the reception of a frequency scanned signal from said frequency and azimuth scanning means, means for disabling said azimuth pulse count discontinuing means except during the generation of a pulse by said azimuth cursor generator means, and means for disabling said frequency scan pulse count discontinuing means except during the generation of a pulse by said frequency cursor generator means.

2. Composite frequency scanning apparatus for scanning radio frequency signals in frequency as a function of time comprising a mixer connected to receive an input signal supplied to said apparatus, means for generating a plurality of local oscillator signals of different frequencies, gating means connected to the outputs for each one of said local oscillator signals for controllably supplying said signals to said mixer, a frequency scan timing oscillator, a frequency scan counter, a gating means for controllably supplying the output of said frequency scan timing oscillator to said frequency scan counter, means for periodically opening the last said gating means, switching means for selectively operating one at a time selected ones of said local oscillator signal gating means in response to said frequency scan counter and means responsive to said switching means for closing said frequency scan timing oscillator gating means upon completion of one cycle of operation of said switching means, a first intermediate frequency amplifier for amplifying the output of said mixer, a second mixer connected to receive the output of said first intermediate amplifier, a second local oscillator having its output connected to said second mixer, frequency modulating means for varying the frequency of said second local oscillator, a saw-tooth waveform generator having its output connected to control said frequency modulating means, said saw-tooth waveform generator being connected to operate in response to the signal from said frequency scan timing oscillator, a second IF amplifier connected to receive the output of said second mixer, said second IF amplifier being a narrow band pass amplifier, and detector means connected to receive the output of said second IF amplifier.

3. Composite frequency scanning apparatus for scanning radio frequency signals in frequency as a function of time comprising means for generating a first local oscillator signal cyclically varying step-wise in frequency as a function of time, said generating means including a plurality of fixed frequency signal sources and switching means for sequentially supplying selected fixed frequency signals to the output of said generating means, means for heterodyning said first local oscillator signal with a radio frequency input signal to be scanned to produce a second signal differing in frequency from the frequency of said input signal as a cyclically varying stepwise function of time, means for generating a second local oscillator signal cyclically varying in frequency as a function of time, the range of variation of frequency of said second local oscillator signal being substantially equal to one step of the stepwise frequency variation of said first local oscillator signal and means for heterodyning said second local oscillator signal with said second signal.

4. In a radio frequency radiation monitoring system having means for scanning received signals in azimuth, azimuth cursor and signal selector apparatus comprising azimuth cursor signal generator means for producing a signal at a portion of the azimuth scan period corresponding to a selected azimuth, said means comprising means for producing a voltage of adjustable magnitude, means for producing a voltage varying in accordance with the azimuth scanning means, means for comparing the last two voltages to produce an output signal when these voltages are substantially equal, and means for generating a pulse of predetermined duration in response to the signal from the last said means, means for indicating the azimuth corresponding to said scan period position, gating means responsive to said azimuth cursor signal to allow the output of said received signal scanning means to pass through said gating means only for the duration of said azimuth cursor signal, and means for utilizing the signal from said gating means.

5. In a radio frequency radiation monitoring system having means for scanning received signals in azimuth, azimuth cursor and signal selector apparatus comprising azimuth cursor signal generator means for producing an azimuth cursor signal at a portion of the azimuth scan period corresponding to a selected azimuth, means for indicating the azimuth corresponding to said scan period portion, gating means responsive to said azimuth cursor signal to allow the output of said received signal scanning means to pass through said gating means only for the duration of said azimuth cursor signal, and means for utilizing the signal from said gating means.

6. In a radio frequency radiation monitoring system having means for scanning received signals in frequency, frequency cursor and signal selector apparatus comprising frequency cursor signal generator means for producing a signal at a portion of the frequency scan period corresponding to a selected frequency, said means comprising means for producing a voltage of adjustable magnitude, means for producing a voltage varying in accordance with the frequency being scanned, means for comparing the last two voltages to produce an output signal when these voltages are substantially equal and means for generating a pulse of predetermined duration in response to the signal from the last said means, means for indicating the frequency corresponding to said scan period, gating means responsive to said frequency cursor signal to allow the output of said received signal scanning means to pass through said gating means only for the duration of said frequency cursor signal and means for utilizing the signal from said gating means.

7. In a radio frequency radiation monitoring system having means for scanning received signals in frequency, frequency cursor and signal selector apparatus comprising frequency cursor signal generator means for producing a frequency cursor signal at a portion of the frequency scan period corresponding to a selected frequency means for indicating the frequency corresponding to said scan portion, gating means responsive to said frequency cursor signal to allow the output of said received signal scanning means to pass through said gating means only for the duration of said frequency cursor signal and means for utilizing the signal from said gating means.

8. Apparatus for frequency scanning radio frequency signals comprising amplifying means including at least two parallel connected radio frequency amplifiers having different ranges of frequency response and adapted to receive a signal to be frequency-scanned, a respective mixer connected to receive the output of each of said amplifiers, means for generating a local oscillator signal swept over a predetermined range of frequencies, means for supplying respective frequency-varied portions of said oscillator signal to respective ones of said mixers, and an intermediate frequency amplifier of a frequency more than half the range of frequency response of any one of said amplifiers coupled to receive the combined output of said mixers, each said mixer being supplied with all frequencies of said swept local oscillator which are of a frequency which will heterodyne in a desired fashion with the frequencies of the mixers' respective amplifier to produce the intermediate frequency of said intermediate frequency amplifier, and each radio frequency amplifier having a frequency range excluding image frequencies which would heterodyne with the local oscillator frequencies of its respective mixer to produce undesired image responses in said intermediate frequency amplifier.

9. Apparatus for frequency-scanning radio frequency signals comprising amplifying means including at least two parallel connected radio frequency amplifiers having different ranges of frequency response and adapted to receive a signal to be frequency-scanned, a respective mixer connected to receive the output of each of said amplifiers, means for generating a local oscillator signal swept over a predetermined range of frequencies, means for supplying respective frequency-varied portions of said oscillator signal to respective ones of said mixers, and an intermediate frequency amplifier coupled to receive a combined output of said mixers, each said mixer being supplied with all frequencies of said swept local oscillator which are of a value which will heterodyne in a desired fashion with the frequencies of the mixers' respective amplifier to produce the intermediate frequency of said intermediate frequency amplifier and each radio frequency amplifier having a frequency range excluding image frequencies which would heterodyne with the local oscillator frequencies of its respective mixer to produce undesired image responses in said intermediate frequency amplifier.

10. Radio frequency radiation monitoring apparatus comprising means for simultaneously scanning received signals in azimuth and in frequency, the repetition rate of the frequency scan being substantially greater than that of the azimuth scan, means for generating azimuth pulses in response to angular rotation of said azimuth scanning means, means for generating a datum azimuth pulse when said azimuth scanning means scans a predetermined reference azimuth, means for counting said azimuth pulses, means for starting said azimuth pulse counting means in response to said datum azimuth pulse, means for discontinuing the count of said azimuth pulses in response to the reception of a maximum in amplitude of an azimuth scanned signal, means for generating each frequency scan during a plurality of frequency scan pulses at predetermined frequency values of said scan, means for counting said frequency scan pulses, means for starting said frequency scan pulse counting means in response to the commencement of said frequency scan, and means for discontinuing the count of said frequency scan pulses in response to the reception of a frequency scanned signal from said frequency and azimuth scanning means.

11. Radio frequency radiation monitoring apparatus comprising means for simultaneously scanning received signals in azimuth and in frequency, the repetition rate of the frequency scan being substantially greater than that of the azimuth scan, a cathode ray tube display apparatus having radial deflection means and angular deflection means, means for operating said angular deflection means in synchronism with said azimuth scan, means for operating said radial deflection means in synchronism with said frequency scan, means for modulating the beam of said cathode ray tube in response to the frequency and azimuth scanned output of said scanning means, means for generating azimuth pulses in response to angular rotation of said azimuth scanning means, means for generating a datum azimuth pulse when said azimuth scanning means scans a predetermined reference azimuth, means for counting said azimuth pulses, means for starting said azimuth pulse counting means in response to said datum azimuth pulse, means for discontinuing the count of said azimuth pulses in response to the reception of an azimuth scanned signal, means for generating during each frequency scan a plurality of frequency scan pulses at predetermined frequency values of said scan, means for counting said frequency scan pulses, means for starting said frequency scan pulse counting means in response to the commencement of said frequency scan, and means for discontinuing the count of said frequency scan pulses in response to the reception of a frequency scanned signal from said frequency and azimuth scanning means.

12. Radio frequency radiation monitoring apparatus comprising means for scanning received signals in azimuth, azimuth cursor generator means for supplying a pulse at a selected portion of each said azimuth scan, means for generating azimuth pulses in response to angular rotation of said azimuth scanning means, means for generating a datum azimuth pulse when said azimuth scanning means scans a predetermined reference azimuth, means for counting said azimuth pulses, means for starting said azimuth pulse counting means in response to said dataum azimuth pulse, means for discontinuing the count of said azimuth pulses in response to the reception of a maximum in amplitude of an azimuth scanned signal, and means for disabling the last said counting means except during the generation of a pulse by said azimuth cursor generator means.

13. Digital indicating apparatus comprising means for repetitively scanning received signals relative to a predetermined signal characteristic to produce an output signal in response to each received signal scanned, said output signal time of occurrence varying in accordance with said characteristics, means for generating during each scan a plurality of scan pulses at respective predetermined discrete values of said signal characteristic, means for counting and indicating the number of said scan pulses, means for starting said scan pulse counting means in response to the commencement of said scan, means for discontinuing the count of said scan pulses in response to one of said output signals from said scanning means, means for producing a selector signal at a portion of the scan period corresponding to a selected range of values of said signal characteristic, and means normally operative to prevent the passage of output signals to said count discontinuing means and responsive to said selector signal to allow a selected output signal to pass to said pulse count discontinuing means.

14. Radio frequency radiation monitoring apparatus comprising means for scanning received signals in frequency, frequency cursor generator means for supplying a pulse at a selected time after the commencement of each of said frequency scan periods, means for generating during each frequency scan a plurality of frequency scan pulses at predetermined frequency values of said scan, means for counting said frequency scan pulses, means for starting said frequency scan pulse counting means in response to the commencement of said frequency scan, means for discontinuing the count of said frequency scan pulses in response to the reception of a frequency scanned signal from said frequency scanning means, and means for disabling said frequency scan pulse count discontinuing means except during the generation of a pulse by said frequency cursor generator means.

15. Radio frequency radiation monitoring apparatus comprising means for scanning radio frequency signals in azimuth and in frequency, a cathode ray tube display apparatus having radial deflection means and angular deflection means, means for operating said angular deflection means in synchronism with said azimuth scan means, means for operating said radial deflection means in synchronism with said frequency scan, means for applying the output signal from said frequency and azimuth scanning means to modulate the beam of said cathode ray tube, frequency cursor generator means for supplying a pulse to the control grid of said cathode ray tube display apparatus at a selected time after the commencement of each of said frequency scan periods, said latter means causing a frequency cursor to be traced on the face of said cathode ray tube, means for generating during each frequency scan a plurality of frequency scan pulses at predetermined frequency values of said scan, means for counting said frequency scan pulses, means for starting said frequency scan pulse counting means in response to the commencement of said scan, means for discontinuing the count of said frequency scan pulses in response to the reception of a frequency scanned signal from said frequency and azimuth scanning means, and means for disabling said frequency scan pulse counting means except during the generation of a pulse by said frequency cursor generator means.

16. Apparatus for frequency scanning radio frequency signals comprising amplifying means including at least two parallel connected radio frequency amplifiers having different ranges of frequency response and adapted to receive a signal to be frequency-scanned, a respective mixer connected to receive the output of each of said amplifiers, means for generating a local oscillator signal swept step-wise over a predetermined range of frequencies, means for supplying respective step-wise frequency-swept portions of the frequency range of said oscillator signal to respective ones of said mixers, an intermediate frequency amplifier coupled to receive the combined output of said mixers, each said mixer being supplied with all frequencies of said swept local oscillator which are of a frequency which will heterodyne in a desired fashion with the frequencies of the mixers' respective amplifier to produce the intermediate frequency of said intermediate frequency amplifier, and each radio frequency amplifier having a frequency range excluding image frequencies which would heterodyne with the local oscillator frequencies of its respective mixer to produce undesired image responses in said intermediate frequency amplifier, a further mixer coupled to receive the output of said intermediate frequency amplifier, and means for supplying to said further mixer a local oscillator signal swept in frequency over a range approximately equal to one step of said step-wise frequency-swept local oscillator signal.

17. In a radio frequency radiation monitoring system having means for scanning received signals in azimuth and in frequency, azimuth and frequency cursor and signal selector apparatus comprising azimuth cursor signal generating means for producing a signal at a portion of the azimuth scan period corresponding to a selected azimuth, means for indicating the azimuth corresponding to said scan portion, frequency cursor signal generating means for producing a signal at a portion of the frequency scan corresponding to a selected frequency, means for indicating the frequency corresponding to said scan portion, gating means responsive to said azimuth and frequency cursor signals to allow the output of said received signal scanning means to pass through said gating means only for the duration of both said azimuth cursor signal and said frequency cursor signal and means for utilizing the signal from said gating means.

References Cited in the file of this patent

UNITED STATES PATENTS

| | | |
|---|---|---|
| 2,488,297 | Lacy | Nov. 15, 1949 |
| 2,525,679 | Hurvitz | Oct. 10, 1950 |
| 2,543,434 | Bryan | Feb. 27, 1951 |
| 2,619,590 | Williams | Nov. 25, 1952 |
| 2,685,687 | Falk | Aug. 3, 1954 |
| 2,698,401 | Korelich | Dec. 28, 1954 |
| 2,700,157 | Hurvitz | Jan. 18, 1955 |
| 2,706,290 | Fox | Apr. 12, 1955 |
| 2,745,096 | Jensen | May 8, 1956 |
| 2,928,046 | Hansel | Mar. 8, 1960 |